United States Patent [19]

Kiriyama

[11] Patent Number: 4,826,381
[45] Date of Patent: May 2, 1989

[54] CONTINUOUS NAIL FOR AUTOMATIC NAILING MACHINE

[75] Inventor: Jiro Kiriyama, Shizuokaken, Japan

[73] Assignee: Kabushukigaisha Kiriyama Shinkenzai, Japan

[21] Appl. No.: 875,323

[22] Filed: Jun. 17, 1986

[51] Int. Cl.⁴ .............................................. F16B 15/08
[52] U.S. Cl. ................................... 411/443; 411/451; 411/908; 411/923
[58] Field of Search ............... 411/442, 443, 444, 473, 411/487, 488, 491, 492, 493, 494, 900, 901, 902, 903, 904, 905, 906, 907, 908, 923

[56] References Cited

U.S. PATENT DOCUMENTS

| | | | |
|---|---|---|---|
| 1,298,015 | 3/1919 | Curtis | 411/923 |
| 1,325,721 | 12/1919 | Hill | 411/923 X |
| 1,953,592 | 4/1934 | Deniston | 411/923 X |
| 2,353,110 | 7/1944 | Camp | 411/473 |
| 2,510,693 | 6/1950 | Green | 411/906 X |
| 3,112,667 | 12/1963 | Brentlinger | 411/487 |
| 3,165,968 | 1/1965 | Anstett | 411/443 |
| 3,492,907 | 2/1970 | Hauck | 411/443 |
| 3,813,985 | 6/1974 | Perkins | 411/442 |
| 3,915,299 | 10/1975 | Miyaoku | 411/907 X |

FOREIGN PATENT DOCUMENTS 1511884 12/1967 France .................................. 411/451

OTHER PUBLICATIONS

"Kowa T Nail", Manufactures brochure from Marukyo U.S.A. Inc., 511 East 4th St., Los Angeles, Calif.
Article from "Popular Science" magazine, Apr. 1987, titled Plastic, pp. 66 and 67 (product sold in U.S. back to 1985).

Primary Examiner—Neill Wilson
Attorney, Agent, or Firm—Merchant, Gould, Smith, Edell, Welter & Schmidt

[57] ABSTRACT

A continuous nail for an automatic nailing machine is disclosed in which each nail (2) of a continuous nail (1) is integrally moulded with a resin in which reinforcing material is mixed to improve its strength. The resin is selected from thermoplastic materials such as polyamide resin to result in good compatibility with the materials to be nailed. Moreover, the sectional configuration and surface characteristics of the shaft (4) of each nail (2) is shaped and finished to make the nail (2) difficult to pull out. Also, the configuration of the head (3) of the nail (2) is shaped and/or colored to give it a good nailing finish on the plaster board pasted with paper.

14 Claims, 2 Drawing Sheets

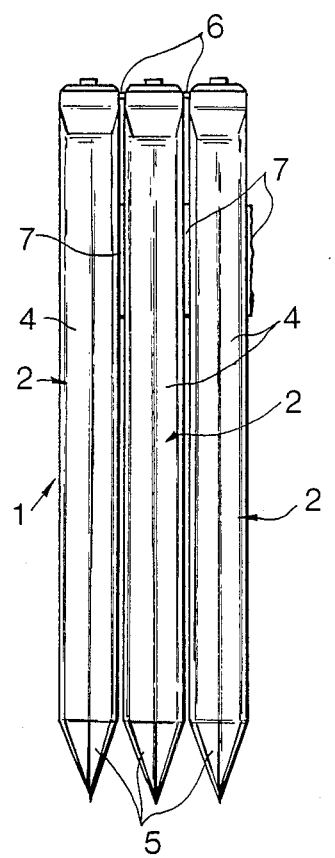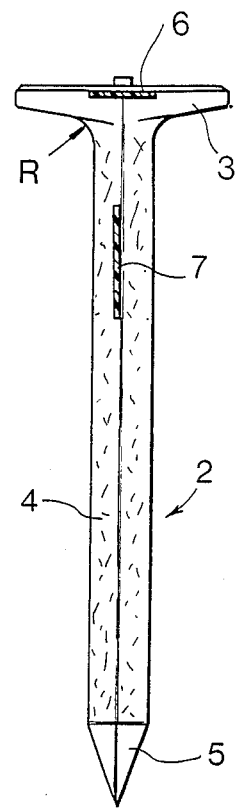
FIG. 1  FIG. 2
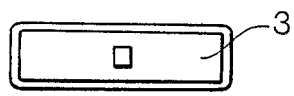
FIG. 3

CONTINUOUS NAIL FOR AUTOMATIC NAILING MACHINE

FIELD OF THE INVENTION

The present invention is related to the improvement of a continuous nail to be used for an automatic nailing machine, especially for a continuous nail moulded integrally from a plastic material.

BACKGROUND OF THE INVENTION

Recently, continuous nails moulded integrally from plastic material have been applied widely for nailing plaster board with a nailing machine for building construction. However, conventional plastic continuous nails have the disadvantage of not only being of low strength but also are generally not adapted well to be used with the materials to be attached, and are easy to pull out.

Moreover, the surface of the plaster board is generally a pasted sheet of paper. When the plaster board pasted with paper is nailed with a conventional continuous nail, the paper is apt to be torn at the head part of the nail, and the finish is not satisfactory.

SUMMARY OF THE INVENTION

The first object of the invention is to intensify the strength of a plastic continuous nail. The other objects are to improve compatibility of the nail with the materials to be attached, as well as to make the nail difficult to be pulled out. A further object of the invention is to prevent the head of the nail from tearing the paper adhered to the plaster board when it is nailed to plaster board, and to offer a continuous nail which achieves a beautiful finish.

The present invention mixes reinforcing materials such as glass fiber, carbon fiber, etc., in the plastic material in order to mould the continuous nail, for the purpose of attaining the above purposes. Further, the invention uses thermoplastic resin materials, e.g. polyamide, for the moulding of the nail, so that the surface of the nail will be melted by frictional heat when it is driven for nailing, which enhances its compatibility with the materials to be nailed. Furthermore, the invention features the cross-section of the shaft of the nail as a polygon of 6 sides or more, a circle, or an oval in order to increase the contact surface with the materials to be nailed. Also, the shaft surface can be stain-finished to increase the frictional coefficient and make the nail difficult to pull out. Further, the invention gives appropriate curvature to the root portion of the head and shaft so that the paper will not be broken when nailed to plaster board pasted with paper, as well as to make a beautiful finish by chamfering and/or painting the head of the nail as necessary.

BRIEF DESCRIPTION OF THE DRAWING

FIG. 1 is a side view of a representative segment of a plurality of nails embodying an exemplary embodiment of the continuous nail of this invention.

FIG. 2 is an elevation of a nail separated from the continuous nail.

FIG. 3 is a top plan view of the nail shown in FIG. 2.

DETAILED DESCRIPTION OF THE INVENTION

Figure 4:
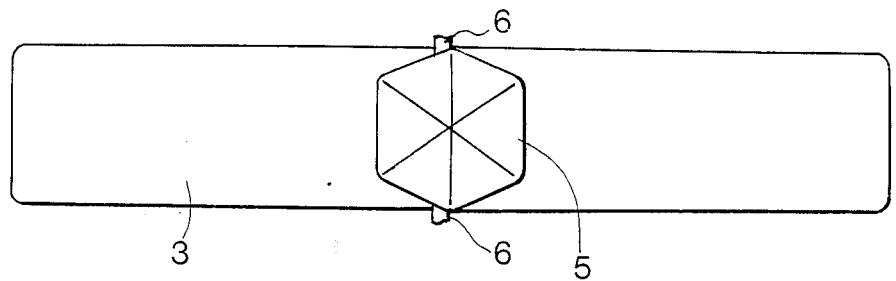
FIG. 4 is a bottom plan view of the nail shown in FIG. 2.

In FIG. 1, reference numeral 1 is a plastic continuous nail by which several tens of nails 2 are moulded continuously as one body. Each of the nails 2 is injection moulded with a thermoplastic resin, for example, polyamide resin, mixed with reinforcing materials, such as fine glass fiber, carbon fiber, etc., to improve the strength of the nail 2.

In FIG. 2, numeral 3 is the head part of the nail 2, 4 is the shaft part, and 5 is the pointed end respectively. The nail shown in FIG. 2 has a shaft of oval or circular cross-section, with a plurality of small dents 10 thereon.

Figure 5:
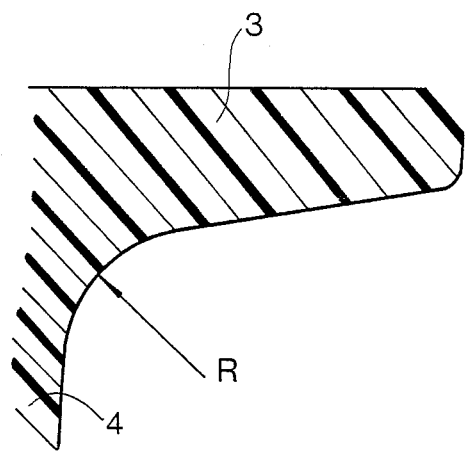
FIG. 5 is a partial sectional view showing the enlarged head part of the nail shown in FIG. 2.

As shown in FIG. 4, the pointed end 5 of the nail 2 is formed as a hexagonal cone, and the shaft part 4 of the nail 2 is made as an hexagonal section which joins with the pointed end part 5. Further, the head 3 of the nail 2 is formed in a nearly rectangular shape as shown in FIG. 3, and the edges of the surface and back face are chamfered respectively. Furthermore, proper curvature is given to the connecting part of the head 3 and shaft 4 as shown in the FIG. 5.

Each of the nails 2 is mutually connected at the head 3 and upper part of the shaft part 4 with those of the adjacent nails through connecting parts 6 and 7, and the center part of the had 3 is a little enlarged to form the gate portion for injection moulding.

Further, the face of the shaft 4 of the nail 2 is formed to a stained condition to make the coefficient of friction larger.

Furthermore, the head 3 of the nail 2 can be colored properly after moulding the continuous nail 1, in accordance with the requirements of the particular situation.

Figure 6:
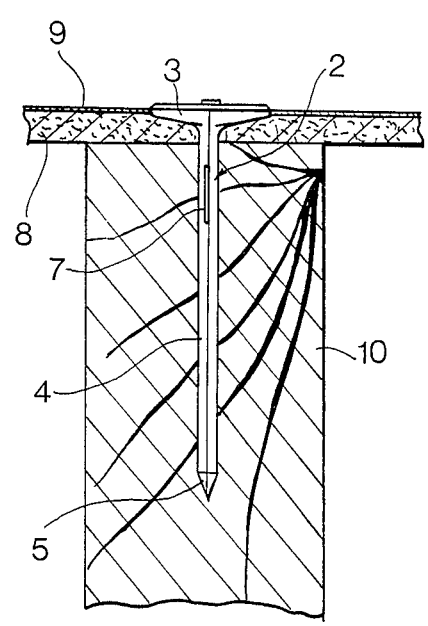
FIG. 6 is a sectional view of the nail shown in FIG. 2, when nailed to plaster board pasted with paper.

In FIG. 6, numeral 8 is a sheet of plaster board pasted with paper 9 to its surface. When the plaster board 8 is nailed to a side beam 10 with the nail 2, nailing can be performed with a strong force, because the nail 2 is made of resin mixed with reinforcing material, and it can be nailed without fear of being broken or bent.

Because the nail 2 is made by injection moulding of a thermoplastic resin such as polyamide resin, a part of the surface of the shaft 4 of the nail 2 will melt by frictional heat during nailing, resulting in good compatibility with the materials to be nailed, e.g. plaster board 8 or side beam 10, and also making the nail difficult to pull out.

The shaft 4 of the nail 2 is made to be hexagonal in section, making a large contact area with the material to be nailed. Also, the surface of the shaft part 4 is formed to a stained condition to make the frictional coefficient larger. Therefore, the nail becomes more difficult to pull out once it is driven in.

However, the sectional shape of the shaft 4 of the nail 2 can also be made to be a polygon of 6 sides or more, a circle, or an oval. The "stained condition" is a condition having many small dents on the surface, and the form and distribution of the dents can be selected properly. At the junction or root part of the head 3 and shaft 4 of the nail 2, proper curvature is given. Therefore, when the nail is driven into the plaster board 8 pasted with paper 9, as shown in FIG. 6, the paper 9 will only be pushed along the curved surface of the head 3 of the nail 2, and will not be torn.

When the head 3 of the nail 2 is colored to the same color as the paper 8, the nail 3 of the nail will not be conspicuous. On the contrary, the nail 2 can be made conspicuous by coloring the head 3 to a quite different color, if desired.

Coloration can be performed after moulding of the continuous nail 1 shown in FIG. 1, or the entire nail 2 can be colored by using a preliminarily colored thermoplastic resin. It is also self-evident that the form of the head 3 and the pointed end 5 of the nail 2, and the configuration, location, etc., of the connecting part 6 and 7 can be designed to a most suitable form in accordance with the sectional configuration, length, etc., of the shaft 4 of the nail 2.

I claim:

1. A continuous nail for use in an automatic nailing machine, comprising:
    (a) a plurality of nails, each nail including a head, shaft and pointed end, a junction portion between said head and said shaft having a smooth, curved surface, said nails being integrally formed in a strip from a thermoplastic resin which contains a reinforcing material, the surface of said shaft including a plurality of dents which increase said shaft's frictional coefficient; and
    (b) a plurality of connecting parts located between and interconnecting adjacent nails into a strip.

2. A continuous nail according to claim 1, wherein said thermoplastic resin is a polyamide resin product, and each nail is formed by an injection moulding process.

3. A continuous nail according to claim 2, wherein said shaft of each nail is a polygon of at least six sides.

4. A continuous nail according to claim 2, wherein said shaft of each nail has a circular or oval shape.

5. A continuous nail according to claim 1, wherein said head of said nail is colored so as to achieve a desired aesthetic effect.

6. A continuous nail according to claim 1, wherein said entire nail is colored to achieve a desired aesthetic effect.

7. A continuous nail according to claim 1, wherein said head of said nail is chamfered.

8. A continuous nail for use in an automatic nailing machine, comprising:
    (a) a plurality of nails, each nail including a chamfered head, a hexagonal shaft and a pointed end, a junction portion between said head and said shaft having a smooth, curved surface, said nails being integrally formed in a strip by an injection moulding process from a polyamide resin product which contains a reinforcing material, the surface of said shaft including a plurality of dents which increase said shaft's frictional coefficient; and
    (b) a plurality of integral connecting parts located between and interconnecting adjacent nails into a strip.

9. A continuous nail according to claim 8, wherein said head of said nail is colored so as to achieve a desired aesthetic effect.

10. A continuous nail according to claim 8, wherein said entire nail is colored so as to achieve a desired aesthetic effect.

11. A continuous nail according to claim 1, wherein said reinforcing material is a fine glass fiber.

12. A continuous nail according to claim 1, wherein said reinforcing material is a carbon fiber.

13. A continuous nail according to claim 8, wherein said reinforcing material is a fine glass fiber.

14. A continuous nail according to claim 8, wherein said reinforcing material is a carbon fiber.

* * * * *